United States Patent [19]

Freihammer

[11] 3,803,745
[45] Apr. 16, 1974

[54] FISHING ROD AND REEL

[75] Inventor: Francis A. Freihammer, St. Cloud, Minn.

[73] Assignee: John T. Burns, St. Cloud, Minn. ; a part interest

[22] Filed: June 23, 1972

[21] Appl. No.: 265,723

[52] U.S. Cl. .................................................. 43/20
[51] Int. Cl. ............................................ A01k 89/00
[58] Field of Search ........................................ 43/20

[56] References Cited
UNITED STATES PATENTS
2,225,719  12/1940  Shotton ................................. 43/20
2,402,882  6/1946  Garr ..................................... 43/20

Primary Examiner—Robert Peshock
Assistant Examiner—Robert F. Cutting
Attorney, Agent, or Firm—James R. Haller; H. Dale Palmatier

[57] ABSTRACT

A fishing rod and reel having a line spool on a spindle attached at one end of the spool directly to the handle, the rod being tubular and of sufficient interior size as to receive and pass the line, bobber, sinker and hook or lure for winding directly on the reel, the tubular rod being aligned with the periphery of the reel, and a spring pressed guide on the handle and bearing against the periphery of the reel spool to restrict rotation of the spool in one direction.

7 Claims, 3 Drawing Figures

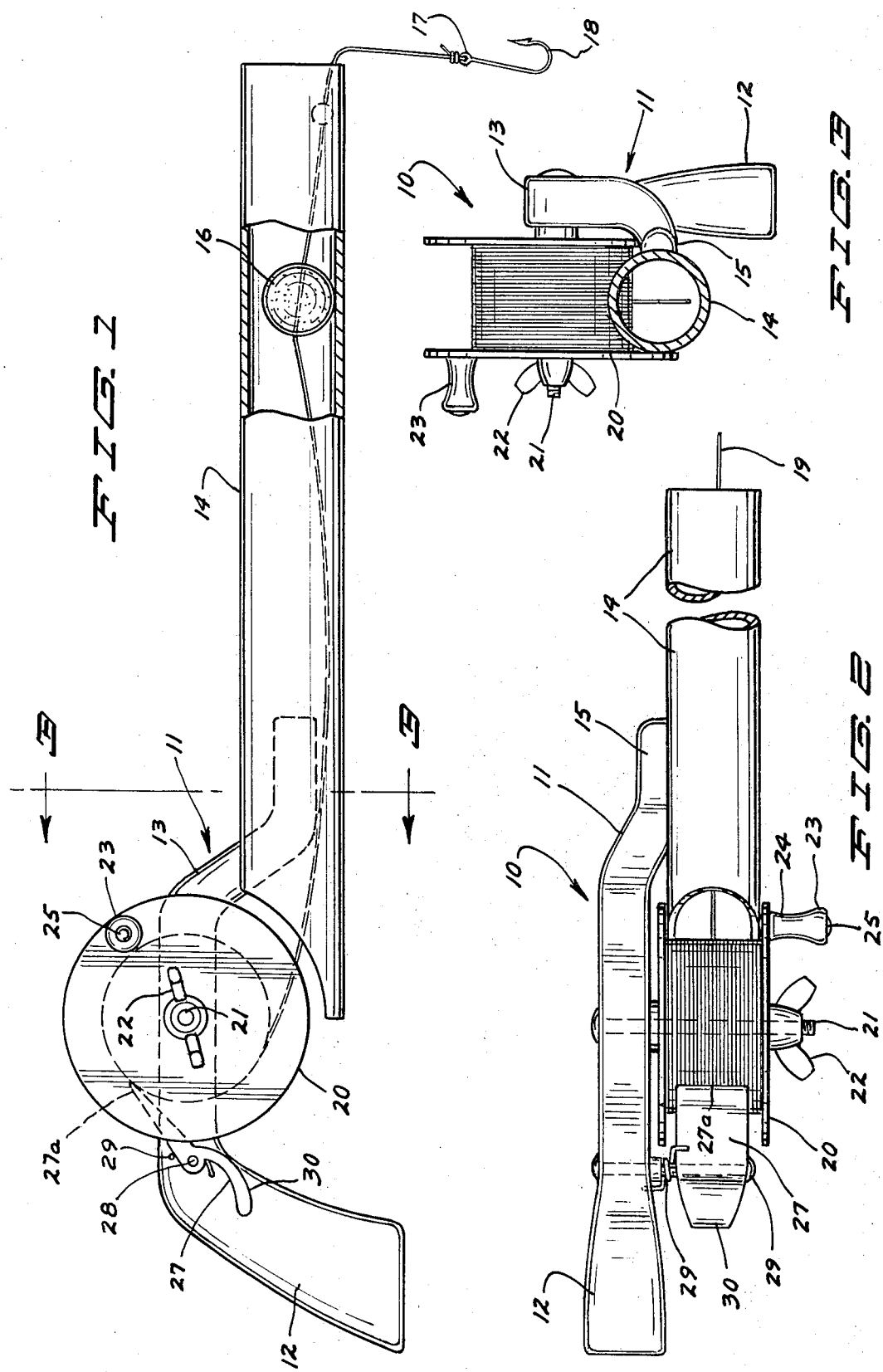

FISHING ROD AND REEL

BRIEF SUMMARY OF THE INVENTION

The present invention relates to the fishing rod and reel which is well adapted for fishing in the winter through the ice. The rod has a handle rearwardly of the reel and is tubular in front of the reel and of sufficient interior size as to allow the line, bobber, sinker and hook or lure to pass through the rod for winding directly on the reel. The reel is mounted at one side of the rod, and at one end of the spool, directly to the handle, in a position wherein the periphery of the reel spool is in alignment with the tubular part of the rod. The rod is also provided with a line guide-brake spring pressed against the periphery of the line winding portion of the spool so as to bear against the line on the spool and hold the line on the spool and restrict reverse turning of the spool unless the guide-brake is released.

BRIEF DESCRIPTION OF DRAWINGS

FIG. 1 is a side elevation view.
FIG. 2 is a top plan view.
FIG. 3 is a section view taken at 3—3 in FIG. 1.

DETAILED DESCRIPTION OF THE INVENTION

One form of the invention is shown in the drawings and is described herein. The rod and reel is indicated in general by numeral 10. The rod 11 has a handle portion 12 and a reel mounting portion 13 extending forwardly from the top end of the obliquely inclined handle 12, and the rod includes a tubular forward portion 14 of rigid material and connected to the rod mounting portion 13 of the reel at one side of the tubular portion as indicated at 15. The tubular portion 14 of the rod is of sufficient interior size as to readily pass the bobber 16, sinker 17, and the hook or lure 18 therethrough. Of course, the bobber, sinker and hook are mounted on a line 19, which is at least partially wound on the core of the reel spool 20. The reel spool is mounted on a spindle or threaded rod 21 which extends through the reel mounting portion 13 of the rod and has the reel secured thereon by a wing nut 22. The reel spool has a handle 23 mounted on one of the spool flanges and consisting of a sleeve portion 24 which will be gripped by the fisherman, and a shank 25 connected as by screw 26 to the spool flange.

A line guide-brake 27 is formed of a relatively thin piece of metal or plastic and is substantially rigid. The line guide-brake is mounted on a post 28 so that it may swing about the post so that the forward end portion 27a of the line guide-brake may swing into and out of engagement with the line wound on the core of the spool. A wire spring 29 is mounted on the post 28 and bears against the line guide-brake 27 so as to continuously urge the line guide toward the core of the reel spool. The rear end portion 30 of the line guide-brake is disposed immediately adjacent the handle 12 so that the fisherman may easily place his thumb on this line guide-brake for releasing the line in order to permit the line to be payed off.

In the use and operation, the line guide-brake will be depressed at the rear end by the fisherman's thumb and the bobber and hook and line will be pulled off the reel, causing the reel to revolve as the line is payed off. During the paying out of the line, the bobber and sinker and hook or lure will pass directly through the tubular portion 14 of the rod. During the fishing experience, this rod will be used similarly to other rods and reels, and when fishing has been completed, the line and the bobber, sinker and hook or lure will be wound onto the core of the spool and will be passed directly through the tubular portion of the rod.

When this has occurred, the line guide-brake 27 will hold the line on the reel and will restrict any rotation of the reel which would release the line and bobber and hook prematurely.

What is claimed is:

1. A fishing rod and reel and including a rotatable reel spool with a core having a fishing line wound thereon, the line carrying a bobber, sinker and hook; a rod rotatably mounting said spool thereon and including a tubular portion extending forwardly from the spool with the hollow interior of the tubular portion being substantially aligned with the spool of the reel, the line being threaded through said tubular portion, and said tubular portion having a diameter relative to said bobber, sinker and hook to receive and pass the bobber, sinker and hook entirely through the tubular portion from one end of the tubular portion to the other end for winding the entire line on the spool.

2. The rod and reel according to claim 1 and including a line guide-brake mounted on the rod and having a portion bearing against the line winding core of the spool, and a spring bearing against said line guide-brake and urging the line guide-brake against the line wound on the spool, said line guide-brake being movable, against the action of the spring away from the spool in order to permit free rotation of the spool.

3. The rod and reel according to claim 1 wherein said rod has a handle portion with the reel spool mounted at one side of the handle portion, a spindle for the spool and extending from one end of the spool through said handle portion for retaining the spool with the periphery thereof in alignment with the tubular portion of the rod.

4. A fishing rod and reel adapted for fishing through the ice and comprising a rod having a handle and a forwardly extending tubular portion, a reel spool releasably mounted to the rod rearwardly of and in substantial alignment with the tubular portion, the reel spool having a fishing line wound thereon which carries a bobber, sinker and hook, the tubular member being of sufficient internal diameter throughout its length to permit the bobber, sinker and hook carried by the line to pass completely through the tubular member from one end of the latter to the other and to be wound on the reel spool.

5. The fishing rod and reel of claim 4 wherein the reel spool is substantially fully open-faced and is releasably mounted to the rod for sidewards removal therefrom, whereby the reel spool and the fishing line carrying the bobber, sinker and hook may be removed as a unit from the rod and may be replaced with a separate reel spool and fishing line carrying a bobber, sinker and hook.

6. The rod and reel according to claim 5 wherein said tubular member is of substantially uniform internal diameter throughout its length.

7. The rod and reel according to claim 6 including a line guide-brake pivotally mounted to the rod handle for easy operation by an operator and having a forwardly extending portion which is spring pressed against the line wound on the reel spool to restrict free rotation of the spool.

* * * * *